United States Patent
Murray et al.

(10) Patent No.: US 9,389,966 B2
(45) Date of Patent: Jul. 12, 2016

(54) BACKING-UP USER DATA

(71) Applicant: 1e Limited, London (GB)

(72) Inventors: Peter Murray, London (GB); Mick Saxton, London (GB)

(73) Assignee: 1E Limited, London (GB)

( * ) Notice: Subject to any disclaimer, the term of this patent is extended or adjusted under 35 U.S.C. 154(b) by 309 days.

(21) Appl. No.: 13/712,769

(22) Filed: Dec. 12, 2012

(65) Prior Publication Data
US 2014/0164333 A1  Jun. 12, 2014

(51) Int. Cl.
  G06F 17/30 (2006.01)
  G06F 11/14 (2006.01)

(52) U.S. Cl.
  CPC ...... *G06F 11/1464* (2013.01); *G06F 17/30306* (2013.01); *G06F 17/30067* (2013.01)

(58) Field of Classification Search
  CPC ............... G06F 17/30306; G06F 17/30067
  USPC .............. 711/114; 707/652, 756, 758, 736; 716/168, 169, 176
  See application file for complete search history.

(56) References Cited

U.S. PATENT DOCUMENTS

| 5,951,640 | A | * | 9/1999 | Laura | 709/217 |
| 6,038,586 | A | * | 3/2000 | Frye | G06F 8/65 718/100 |
| 6,496,977 | B1 | * | 12/2002 | Hamilton, II | G06F 8/71 707/999.202 |
| 7,774,845 | B2 | * | 8/2010 | Shipman | 726/23 |
| 7,849,457 | B1 | | 12/2010 | Pulido | |
| 7,937,435 | B2 | * | 5/2011 | Alstad et al. | 709/203 |
| 7,996,610 | B2 | * | 8/2011 | Wan et al. | 711/114 |
| 2002/0053044 | A1 | | 5/2002 | Gold et al. | |
| 2004/0083355 | A1 | | 4/2004 | Smith et al. | |
| 2004/0128203 | A1 | | 7/2004 | Pierre et al. | |
| 2005/0251635 | A1 | | 11/2005 | Yoshinari | |
| 2006/0036908 | A1 | | 2/2006 | Helliker et al. | |
| 2006/0117069 | A1 | * | 6/2006 | Van Der Leeden | 707/200 |
| 2006/0129615 | A1 | | 6/2006 | Derk et al. | |
| 2007/0214231 | A1 | | 9/2007 | Skinner et al. | |

(Continued)

FOREIGN PATENT DOCUMENTS

| JP | 2005032046 A | 2/2005 |
| JP | 2007226828 A | 9/2007 |

(Continued)

OTHER PUBLICATIONS

Search Report issued in related application No. GB 1222378.0 on Jun. 27, 2013.

*Primary Examiner* — Jean M Corrielus
(74) *Attorney, Agent, or Firm* — EIP US LLP

(57) ABSTRACT

User data stored on a first computer in a network is backed up to a computer which is one of a plurality of other computers in the network. The user data may be backed-up because a new operating system is to be installed. A request message indicating that the user data needs to be backed up is transmitted from the first computer to the network and is received at the other computers. One of the other computers is selected based on data indicating the extent to which each of the replying computers complies with one or more selection criteria. The first computer then transmits the user date to the selected computer with an identifier identifying the user data. The user data is stored in storage associated with the selected computer. The first and other computers may be in the same sub-network. The selection may be made by the first computer.

23 Claims, 4 Drawing Sheets

(56) References Cited

U.S. PATENT DOCUMENTS

| | | | |
|---|---|---|---|
| 2008/0046708 A1* | 2/2008 | Fitzgerald | G06F 8/63 713/2 |
| 2008/0195675 A1* | 8/2008 | Torrent | G06F 11/1464 |
| 2008/0263192 A1* | 10/2008 | Murphy | G06F 17/30067 709/223 |
| 2010/0107156 A1* | 4/2010 | Andersen | G06F 8/60 717/178 |
| 2010/0325410 A1* | 12/2010 | Fitzgerald | G06F 8/63 713/2 |
| 2011/0060945 A1 | 3/2011 | Leprince et al. | |
| 2012/0066485 A1 | 3/2012 | Hosea et al. | |

FOREIGN PATENT DOCUMENTS

| | | |
|---|---|---|
| JP | 2008-83942 A | 4/2008 |
| WO | 2009109925 A1 | 9/2009 |

* cited by examiner

US 9,389,966 B2

BACKING-UP USER DATA

TECHNICAL FIELD

The present invention relates to a method of backing up user data in a networked computer system, a networked computer system and computer programs for carrying out the method.

BACKGROUND

It is known to back up user data on one computer to another computer in a network. That may be done for various reasons including backing up to preserve user data whilst a new operating system is installed on a computer. User data includes settings and other data which may be termed the personality. Typically, the user data is backed up to a central server. U.S. Pat. No. 6,496,977 for example relates to a system and method for simplifying a system upgrade process. Initially, an automated data collection script is updated to include the identity and location of files containing personality and license information. A list of workstations to be upgraded is then compiled. The workstation list is called by the data collection script when it is executed. The data collection script collects personality and license information from the specified file on the listed workstations. The data collection script then outputs personality and license information to a temporary file at a network file system server. An upgrade script is executed after the workstations' operating systems have been upgraded, which uses the output from the data collection script for restoring personality and license information that may have been deleted or written over during the system upgrade.

It is desirable to reduce the load on a network and on servers in a network.

SUMMARY

In accordance with one aspect of the present invention, there is provided a method of backing up user data stored on a first computer in a network to a computer which is one of a plurality of other computers in the network, the method comprising:

transmitting from the first computer to the network a request message indicating that user data of the first computer needs to be backed up;

receiving the message at the said other computers;

selecting one of the other computers based on data provided by the other computers indicating the extent to which each of the replying computers complies with one or more selection criteria, transmitting the user data from the first computer to the selected computer with an identifier identifying the user data; and storing the transmitted user data in storage associated with the selected computer.

In an embodiment the first computer receives replies to the message from at least some of the plurality of other computers indicating the extent to which each of the replying computers complies with one or more selection criteria, and the first computer selects one of the other computers based on the replies.

In an embodiment, the first and other computers are in the same sub-network of the network.

In an embodiment of the invention the user data is backed up before a new operating system is installed on the first computer. Once the operating system is installed the backed up data is retrieved from the selected computer and restored to the first computer. By selecting a back-up computer from a plurality of computers on the network, the load on any one computer is reduced. The invention does not need a central server to store backups of user data but instead enables backups to be distributed over plural computers, which may be workstations, desk-top machines or mobile machines in the network. In an embodiment, the first and other computers are on the same sub-network.

Further features and advantages of the invention will become apparent from the following description of illustrative embodiments of the invention, given by way of example only, which is made with reference to the accompanying drawings.

DETAILED DESCRIPTION

Figure 1:
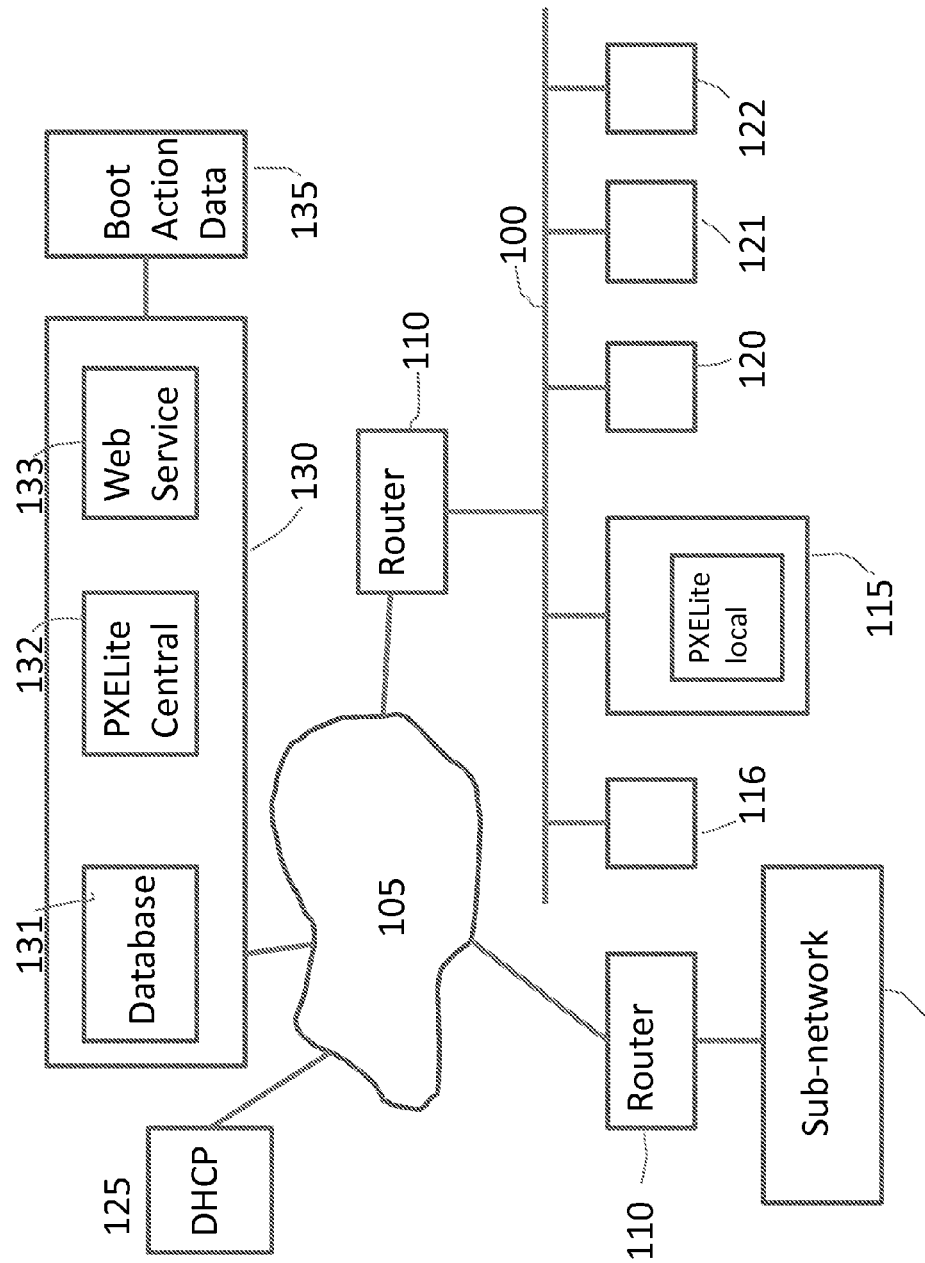
FIG. 1 is a schematic block diagram of a computer network.
Figure 2:
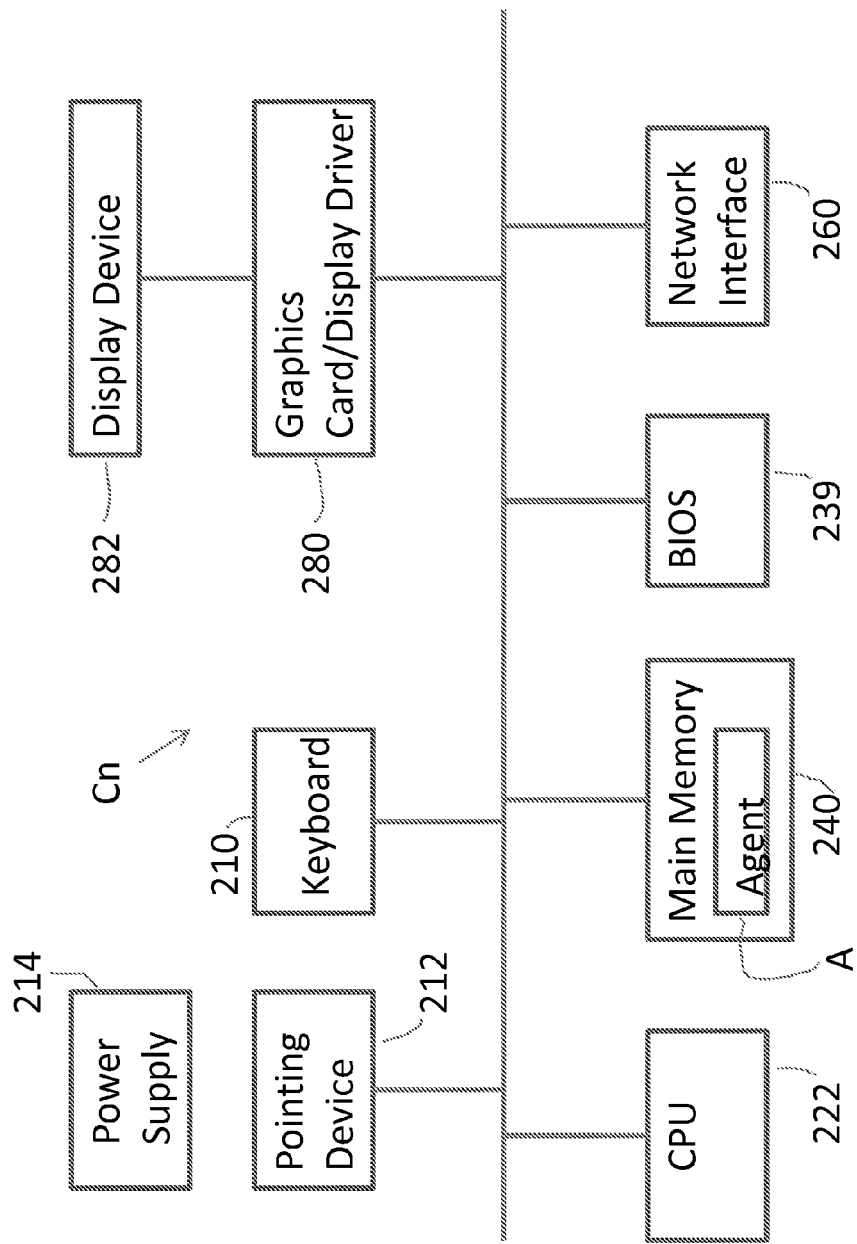
FIG. 2 is a schematic block diagram of a computer of the network of FIG. 1.

Computer Network, FIGS. 1 and 2

As shown in FIG. 1, a network comprises a systems management tool 130, for example a Systems Center Configuration Manager (SCCM), and a database 135 which are connected to the communications network 105. The systems management tool 130 includes a configuration manager database 131, a web service 133, and a DHCP server 125, but these items are not all essential to all embodiments of the present invention.

Referring to FIG. 1, a network comprises one or more sub-networks 100, 101 connected to a communications network 105 by routers 110. Only two sub-networks, 100 and 101, are shown in FIG. 1. Machines of different types may be connected to the branch network 100, for example personal computers 115, 116, desktop machines, laptops and workstations 121, 122. Each machine is equipped with conventional data storage (not shown) and there may be an additional storage resource (shown at 1151) associated with each machine in the sub-network. FIG. 1 also shows a target machine 120 which is to be network booted. The target machine 120 in this example is a computer having an old operating system and application programs together with user data. User data includes settings and other data, for example files, generated by a user. Settings are usually stored in the Windows registry on computers having a Microsoft Windows Operating system. User data may also be termed "personality" data. Two or more, and preferably all of the other machines 115, 116, 121 and 122 and the target machine 120 in the subnet are configured by program code installed in the machines to carry out the present invention. The program code includes various settings, referred to as registry settings, which set values for various parameters including time out periods and maximum storage allocations as will be described below.

Referring to FIG. 2, the computers 115, 116, 120, 121 and 122 each comprises, amongst other items: a CPU 222; a main memory 240 for example a hard disk drive or other storage device, for example electronic memory; a network interface 260 a BIOS 239 and one or more busses 216. The BIOS 239 is typically a Read Only Memory (ROM). The machines may also have other items for example a display driver 280 coupled to a display device 282; human interface devices or input devices for example a keyboard 210 and a pointing device 212. The items are conventional and interact via the buss(es) 216 in a conventional way. The network interface couples the computer to the network 105 via the router 110 and to other computers in the sub-network 100 having respective IP (Internet Protocol) addresses. The computer also comprises a power supply 214. Programs are stored in the main memory 240 and executed by the CPU 222. The computers 115 to 122 of the sub-network each comprise an agent 241 of the configuration manager. The agent code is stored in the main memory 240.

Figure 3:
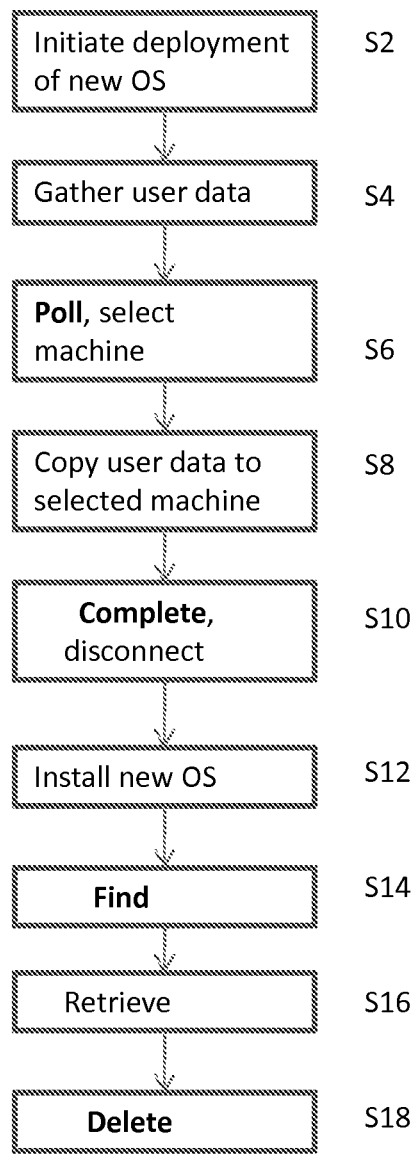
FIG. 3 is a flow chart of an illustrative process for backing up user data in course of installing a new Operating System on a computer of the network of FIG. 1.

Overview of an Illustrative Embodiment of the Present Invention FIG. 3

Referring to FIG. 3, in step S2 a process is initiated to deploy a new operating system to the target computer 120. In step S4, user data at the target computer is gathered into a file by a software tool provided for that purpose. An example of such a tool is Microsoft User State Migration Tool (USMT) which is part of the Microsoft Windows Automated Installation Kit. In this example it is assumed the target computer 120 has that Operating System but the invention is not limited to Microsoft Windows Operating Systems. Other operating systems and migration tools are provided by other vendors.

In step S6, the target computer 120 polls the other machines 115, 116 by broadcasting a poll request message to all machines on the subnet. The response by the other machines on the subnet determines which of the other machines complies with one or more selection criteria for judging which of the other machines is the "best" for backing up the user data of target machine 120. Examples of selection criteria and a selection process are described below.

In step S8, the user data is transferred to the selected machine and stored in storage associated with the selected machine. The backed up user data is a file and is given an identifier, for example a file name. The file name is stored in a storage medium independent of the target machine.

In step S10, the target machine signals to the selected machine that the transfer of user data is complete and the target machine disconnects from the selected machine.

In step S12, the new Operating System is installed on the target machine. This will be described in more detail below. The installation of the new Operating System in this example deletes the original user data.

Once the installation of the new Operating System is complete, in step S14, the target computer transmits on the subnetwork a find message to find the backed up user data. The find message identifies the target computer and includes data at least identifying the name of the backed up user data file. This is needed because data identifying where the user data is backed up either does not exist at the target computer or was lost when the new Operating System was installed.

In step S16 the machine storing the user data responds to the find message and transfers the user data to the target machine 120.

In step S18 the backed up user data is deleted from the selected machine once it has been transferred back to the target machine 120.

Selection Criteria

Examples of selection criteria include one or more of the following. These criteria relate to machines which are candidates for selection.

a) Is the ability to back up user data enabled on the machine?

b) Does the machine have sufficient allocation of storage space? The allocation is a maximum amount of storage predefined by a registry setting for that machine. If the required backup space exceeds the allocation the machine is automatically deemed to have insufficient space.

c) Does the machine have sufficient empty storage space? If the machine has 5% or less spare storage it is automatically deemed to have insufficient space. Otherwise the amount of available storage space is compared with data in the polling request message indicating how much space is needed. A machine with most spare space is preferred to a machine with less spare space.

d) Does the machine have available network connections? The number of network connections may be limited by the operating system.

In one example of the invention, a machine is selected based on all four of the criteria a) to d).

Other additional criteria which may be used include e) How many back up sessions is the computer running? The machine running the fewest sessions is preferred.

f) What is the type of machine? A server is preferred to a PC. A desktop PC is preferred to a laptop.

g) Which machine stores the fewest backups? A machine storing no, or the fewest, back-ups is preferred to a machine with one or more stored back-ups. Otherwise the machine with fewest stored back-ups is preferred.

h) Is power management active? A machine without power management active is preferred to a machine with power management active because there is no risk of it adopting a low power state during the interaction with the target machine. If power management is active it may be set to avoid adopting a low power state at least while the machine interacts with the target machine.

It is a matter of choice which one or more selection criteria is/are used. An embodiment of the invention uses at least criteria a) to c) and some embodiments additionally use one, more, or all of criteria d) to h) plus any other criteria.

Selection Process

When the target machine sends the poll request to the other machines it initiates a selection process according to the selection criteria. In an embodiment, the other machines send to the target machine data relating to the selection criteria and the target machine selects one of the other machines according to a selection algorithm which takes account of all the selection criteria chosen to be used.

The algorithm used is a matter of choice of a programmer; such algorithms are within the normal skill of programmers.

In an embodiment some of the criteria are evaluated at the other machines without transmitting data to the target machine. For example, a machine which does not have the ability to back up user data will not respond to a poll request. As described below, a poll request may include data indicating the amount of storage space required and a machine which has insufficient allocation and/or insufficient spare space may not respond to the poll request.

The selection algorithm may weight the various criteria according to an order of priority. The order and relative weightings are a matter of choice by the programmer.

The process of FIG. 3 will now be described by way of example in more detail with reference to FIG. 4. In this example the target machine evaluates the selection criteria. Various messages are transmitted on the sub-network. The messages may be Internet Protocol messages including the IP addresses of the senders.

Figure 4:
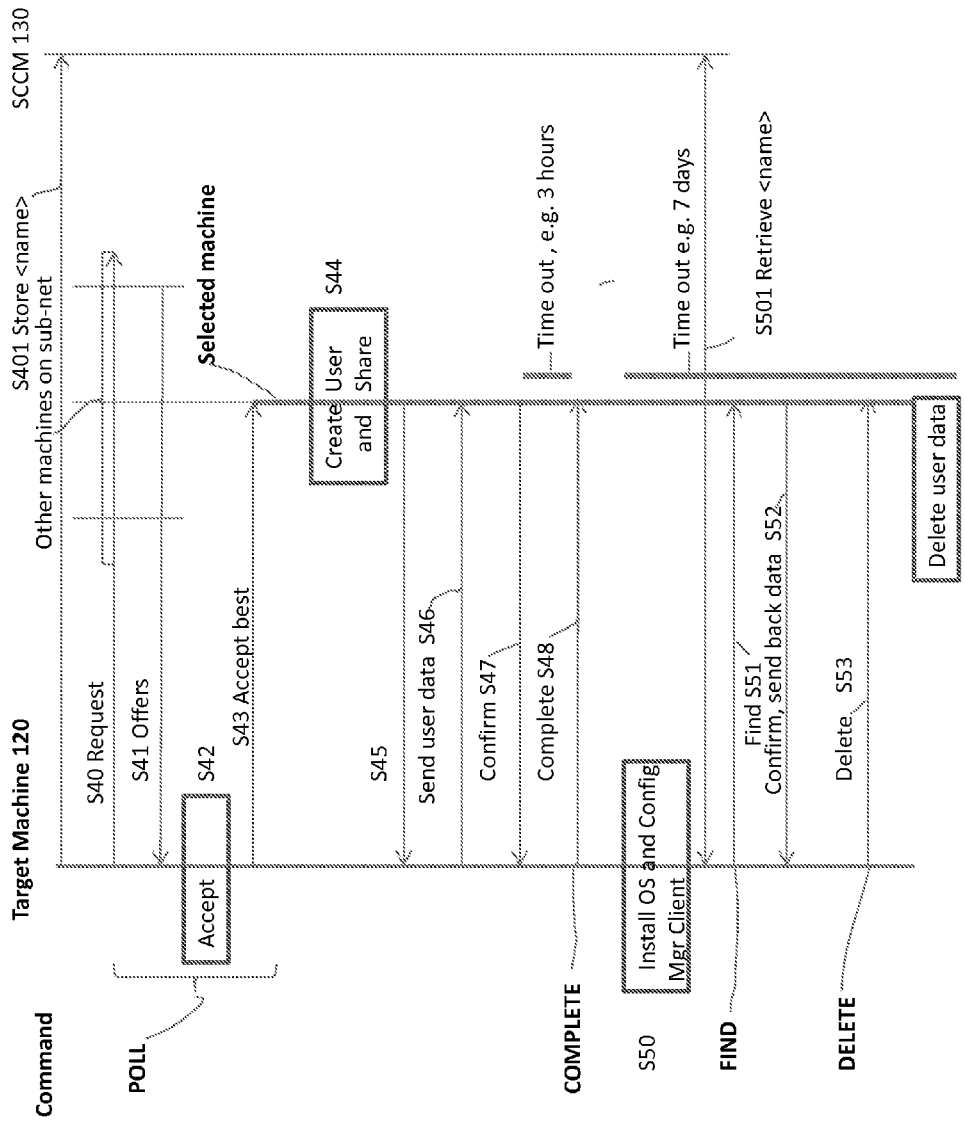
FIG. 4 is a chart of illustrative interactions of a computer on which the Operating System is installed and computer which stores the back up of user data.

FIG. 4 Back-Up Procedure

This example of the back-up procedure uses four commands. The machines on the sub-net have an agent which includes program code which causes them to carry out the commands. In this embodiment, the agent is an agent of the SCCM and the commands are issued and implemented as a task sequence of the SCCM. The commands are:

POLL, <name>, size where <name> is an alphanumeric representing the desired name for the back-up file of user data, and size is the number of Megabytes required to store the user data.

The <name> needs to be chosen and recorded by the user. If the name is lost it will be very difficult, or may be impossible, to find the backed up data. In one embodiment, the name is recorded in the Configuration manager in a way it can be recovered later. Alternatively it may be memorised or otherwise recorded by the user.

COMPLETE, <name> which is used when the user data has been successfully copied to the store associated with the machine selected by the POLL command. The backed up file on the selected machine is set to read only. This command may also be used to change a default timeout period pre-set as a registry setting. The extended period may be another setting in the registry or it may be defined by additionally including a time parameter in the command.

FIND, <name>. This command is transmitted, e.g. broadcast, on the sub-network to find where the user data is stored. (It is needed because installing a new operating system on the target machine loses all data). The name is retrieved by the user if the user has memorised or otherwise recorded it. In one embodiment issuance of the command is preceded by instructions which automatically retrieve the <name> from the configuration manager. The find command allows the backed up data to be retrieved without knowing the location where the data is stored, provided the name of the backed up data file is known.

DELETE, <name> is used to delete the back-up file from the selected machine once the backed up data has been transferred back to the target machine after installation of the new operating system.

In an embodiment, the POLL and COMPLETE commands are run from the target machine in the order set out above in the configuration manager task sequence to back up the user data.

Referring to FIG. 4, as shown at S401, the <name> is provided manually in a command line instruction to the Configuration Manager 130 when the user (or administrator) initiates the process. The name may be a reference to an already existing value such as the current target machine name, or it may be any arbitrarily conceived string value. It is provided by the configuration manager as a parameter to the POLL command.

The POLL command causes the target machine 120 to transmit, e.g. broadcast, S41 a request on the sub-network requesting access to storage space for backing up the user data. All, or at least some, of the machines which receive the request reply with data relating to the selection criteria. As discussed above one or more machines may not reply because they evaluated one or more criteria and failed to satisfy the criteria. The reply, called an offer, from each machine is unicast S41 back to the target machine. The reply includes the address of the replying machine and data from which the target machine can determine the extent to which it complies with the criteria.

The target machine 120 receives the offers and selects S42 one of them according to the selection algorithm discussed above. It then unicasts S43 an accept message back to the selected machine which is the machine with the best offer. The accept offer includes the <name> of the file to be backed up.

The selected machine, on receipt of the accept message, creates S44 User and Share names and sends S45 them back to the target machine. The target machine 120 then automatically connects S46 to the share and transfers a copy of the user data to the storage on the selected machine. The selected machine confirms S47 it has the data.

Once the user data has been transferred to the selected machine and received S47 the confirm message the COMPLETE command is used S48. If the COMPLETE command is not received within a set time out period, e.g. 3 hours or other period selectable by a user, the data transfer is abandoned. The COMPLETE command informs the selected machine that the user data has been copied to it successfully and should be retained S49 for set time out period, an example of which is 7 days but is selectable by the user.

Once the transfer of the user data is complete, the new Operating System is deployed S50 to the target machine 120. The deployment will be described in more detail below.

Once the new Operating System has been installed on the target machine the <name> is retrieved from the SCCM and the FIND <name> command is used S51. It is transmitted, e.g. broadcast, on the sub-network from the target machine 120. The machine having the backed up user data responds S52 with a confirm message and copies the user data back to the target machine 120.

Once the user data is copied back the target machine uses the DELETE, <name> command. The command is sent S53 to the machine backing up the user data to delete the user data from the machine which stored it.

If the DELETE command is not used within the timeout period (e.g. 7 days) the user data is automatically deleted at the end of the time out period.

In one embodiment, the FIND and DELETE commands are run from the target machine 120 in the order set out above in a script to retrieve the user data and delete it from the machine which temporarily stored it. The script includes instructions which retrieve S501 the <name> from the configuration manager 130 and insert it into the FIND command.

Operating System Deployment

Alternatively it may be installed over the network in known manner.

In one embodiment, deployment is controlled by the Configuration Manager in known manner in accordance with the task sequence.

Alternatively, the Operating System may be deployed in known manner using software provided by 1E Limited, for example NOMAD Branch and PXE LITE. Two or more of, and preferably all, the other machines 115, 116, 121, 122 in the sub-network have:

a network boot program
Windows PE pre-installation files
Operating System images, and
"PXE LITE local"

Consequently, up-to-date operating system images will be available on two or more of the machines 115, 116, 121,122 in the sub-network 100. The machines having PXE Lite local installed are referred to as "PXE Lite local machines".

PXE LITE Local interacts with a program "PXE LITE Central" which is installed either in the configuration manager 131 or in another machine (not shown) which accesses the SCCM to deploy the appropriate Operating System to the target machine.

Computer Programs

The invention also provides a suite of one or more computer programs which, when run on a computer system, implements the procedures described above. The computer program(s) is/are stored on one or more non transitory carriers, for a computer readable medium for example a hard disk, an optical disc, a magneto-optical disk, a compact disc, a magnetic tape, electronic memory including Flash memory, ROM and RAM, a RAID or any other suitable computer readable storage device.

The programs include the scripts which issue the commands from the target machine as described above. The target machine includes a program for evaluating which of the other machines is best able to store the user data. It also includes a program for gathering the user data into a file for back up.

Another program is installed on each of a plurality of computers in the sub-network to enable them to store the registry settings and interact with the target machine to implement the commands and store and retrieve the backed up user data. This other program includes selection code which responds to the POLL command to indicate to the target machine the extent to which it complies with selection criteria. If selected by the target machine the selected computer responds by storing the file of user data. This other program responds to the COMPLETE command to set the stored user data to read only and extend a time out period. This other program responds to the FIND command to transmit the user data back to the target computer. This other program responds to the DELETE command to delete the back up. If no DELETE command is received within a time out period the back up is deleted automatically.

A registry is set up on each of the computers to store default time out periods and extended time out periods.

Variants

The above embodiments are to be understood as illustrative examples of the invention. Further embodiments of the invention are envisaged.

The new operating system may be installed manually by a user from a data carrier, for example a CD or other storage medium.

In a partly manual procedure, at step 410 the user creates the <name> and records it manually e.g. on paper or remembers it and enters it manually into the POLL command and into the FIND command.

Although the description above backs up user data because a new Operating System is to be installed, the procedure described with reference to FIGS. 3 and 4 may be used to back up user data in other circumstances.

The user data may be stored in the main storage of the selected computer, for example its hard drive which may be a disk drive and or a solid state drive. Alternatively or additionally it may be stored in other storage media associated with the selected computer for example storage external to the selected computer provided the storage location is known and accessible.

Whilst the description above describes only one back up occurring in a subnet, back-ups of two or more machines may occur at the same time in the sub-network.

Two machines may back up onto the same back-up machine provided that the backed up file names are different.

Whilst the description above refers to using one script to a) automatically store the <name>, and run the POLL and COMPLETE commands from the target machine and another script to b) automatically retrieve the <name> and run the FIND and DELETE commands from the target machine, the <name> may be recorded manually on paper for example or memorised, and the four commands may be issued manually.

Whilst the description above refers to computers interacting only in a sub-network, the target machine may interact with other computers anywhere in the whole network to back up its user data.

Whilst in the description above refers to Operating Systems, the USMT tool and the system management tool provided by Microsoft Corporation, the invention is not limited to those; other vendors provide Operating Systems and equivalent migration tools.

Whilst in the description above the selection of the best machine to back-up the user data is made at the target machine, the selection could be made by interaction of the other machines without involving the target machine. The selected machine would then send a message to the target machine identifying itself as the back-up machine.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of backing up user data stored on a first computer in a network to a computer which is one of a plurality of other computers in the network, the method comprising:
    transmitting from the first computer to the network a request message indicating that user data of the first computer needs to be backed up;
    receiving the message request at the other computers;
    selecting one of the other computers based on data provided by the other computers in response to the request message indicating whether each of the other computers complies with one or more selection criteria;
    transmitting the user data from the first computer to the selected computer with an identifier identifying the user data; storing the transmitted user data in storage associated with the selected computer; and
    further comprising retrieving the user data from the storage associated with the selected computer, the retrieval including the step of transmitting from the first computer to the network a find message indicating at least the identifier of the user data for the purpose of finding the computer backing up the user data.

2. The method according to claim 1, wherein once the first computer has transmitted all the user data to the selected machine, the first computer transmits a complete message indicating the transmission of user data is complete and disconnects from the selected computer.

3. The method according to claim 1, wherein the computer backing up the user data responds to the find message by transmitting the identified user data to the first computer.

4. The method according to claim 3, wherein the find message is broadcast on the network.

5. The method according to claim 3, wherein the first computer receives the user data and once the first computer has completed storage of the user data transmits to the selected machine a delete message instructing the selected machine to delete the user data.

6. The method according to claim 1, wherein the network has one or more sub-networks, the first and other computers are in the same sub-network of the network and the request message is broadcast within the sub-network.

7. The method according to claim 1, wherein the first computer receives from the other computers replies indicating whether each of the replying computers complies with one or more selection criteria, and the first computer selects one of the replying computers.

8. The method according to claim 1, wherein the selection criteria for selecting a computer to back up the user data include one or more of:
   a) whether an ability to back up user data is enabled on the computer;
   b) whether a maximum amount of storage space for back up allocated to the computer is sufficient; and
   c) whether the computer has sufficient empty storage space.

9. The method according to claim 8, wherein the selection criteria for selecting a computer to back up the user data additionally includes one or more of:
   d) whether the computer has available connections;
   e) the number of sessions that the computer is running;
   f) the type of computer;
   g) which computer stores the fewest backups; and
   h) whether power management is active.

10. The method according to claim 1, wherein the selection is made according to a selection algorithm which weights the selection criteria according to an order of priority.

11. A method of installing an operating system on a first computer in a network to replace an existing operating system on the first computer, the method comprising:
   transmitting from the first computer to a plurality of other computers in the network a request message indicating that user data of the first computer needs to be backed up;
   receiving the request message at the other computers;
   selecting one of the other computers based on data provided by the other computers in response to the request message, indicating whether each of the other computers complies with one or more selection criteria;
   transmitting the user data from the first computer to the selected computer with an identifier identifying the user data;
   storing the transmitted user data in storage associated with the selected computer;
   replacing the existing operating system of the first computer with another operating system whereby the user data may be lost; and
      after the replacement of the operating system, retrieving the user data from the storage associated with the selected computer, the retrieval including the step of transmitting from the first computer to the network a find message indicating at least the identifier of the user data for the purpose of finding the computer backing up the user data.

12. The method according to claim 11, wherein the computer backing up the user data responds to the find message by transmitting the identified user data to the first computer.

13. The method according to claim 11, wherein the find message is broadcast on the network.

14. The method according to claim 11, wherein the first computer receives the user data and, once the first computer has completed storage of the user data, transmits to the selected machine a delete message instructing the selected computer to delete the user data.

15. The method according to claim 11, wherein the selection criteria for selecting a computer to back up the user data include one or more of:
   a) whether an ability to back up user data is enabled on the computer;
   b) whether the maximum amount of storage space for back up allocated to the computer is sufficient; and
   c) whether the computer has sufficient empty storage space.

16. The method according to claim 15, wherein the selection criteria for selecting a computer to back up the user data additionally includes one or more of:
   d) whether the computer has available connections;
   e) the number of sessions the computer is running;
   f) the type of computer;
   g) which computer stores the fewest backups; and
   h) whether power management is active.

17. The method according to claim 11, wherein the selection is made according to a selection algorithm which weights the selection criteria according to an order of priority.

18. The method according to claim 11, wherein the network has one or more sub-networks, the first and other computers are in the same sub-network of the network and the request message is broadcast within the sub-network.

19. The method according to claim 11, wherein the first computer receives from the other computers replies indicating whether each of the replying computers complies with one or more selection criteria, and the first computer selects one of the replying computers.

20. A non-transitory computer readable medium storing instructions, when run on a computer in a network comprising a first computer and at least one further computer, execute a method comprising:
   on receiving a request message indicating that user data of the first computer needs to be backed up, replying to the message indicating whether the computer complies with one or more selection criteria,
   responding to the selection of the computer by storing the user data sent from the first computer with an identifier identifying the user data, and
   responding to a find command from the first computer including said identifier of the stored user data to transmit the user data to the first computer.

21. A non-transitory computer readable medium according to claim 20 wherein the method further includes responding to a complete command received from the first computer, and indicating completion of transfer of user data from the first computer, to extend a preset time out period.

22. A non-transitory computer readable medium according to claim 20, wherein the stored program includes code which when run on the computer responds to a delete command from the first computer to delete the stored user data.

23. A non-transitory computer readable medium according to claim 22, wherein the method further includes deleting the stored data if no delete command is received from the first computer within a set time out period.

* * * * *